US008507821B2

(12) United States Patent
Varghese et al.

(10) Patent No.: US 8,507,821 B2
(45) Date of Patent: Aug. 13, 2013

(54) PROFILE BASED LASER CUTTING WITHIN A HIGH-SPEED TRANSPORT DEVICE

(75) Inventors: George M. Varghese, Elk Grove Village, IL (US); Arkadiusz Nieckarz, Palatine, IL (US); Gregory Wilmes, Chicago, IL (US); Brian Bowers, Mundelein, IL (US)

(73) Assignee: Bell and Howell, LLC, Durham, NC (US)

(*) Notice: Subject to any disclaimer, the term of this patent is extended or adjusted under 35 U.S.C. 154(b) by 421 days.

(21) Appl. No.: 12/406,553

(22) Filed: Mar. 18, 2009

(65) Prior Publication Data

US 2010/0236997 A1   Sep. 23, 2010

(51) Int. Cl.
*G06K 9/00*   (2006.01)
*B23K 26/00*   (2006.01)

(52) U.S. Cl.
USPC .................................... 209/584; 219/121.68

(58) Field of Classification Search
USPC ............. 219/121.68, 121.69, 121.72, 121.83; 700/168; 264/400; 209/584
See application file for complete search history.

(56) References Cited

U.S. PATENT DOCUMENTS

| 3,691,726 | A | * | 9/1972 | Stephens et al. ............. 53/381.3 |
| 3,753,836 | A | * | 8/1973 | Buckholz ...................... 156/521 |
| 4,318,322 | A | * | 3/1982 | Russell ............................ 83/94 |
| 4,419,915 | A | * | 12/1983 | Oussani ......................... 83/887 |
| 4,421,587 | A | * | 12/1983 | Guenther et al. ............. 156/256 |
| 4,970,600 | A | * | 11/1990 | Garnier et al. ........... 219/121.68 |
| 5,376,770 | A | * | 12/1994 | Kuhl et al. ............... 219/121.83 |
| 6,420,674 | B1 | * | 7/2002 | Cole et al. ................ 219/121.67 |
| 2005/0087978 | A1 | * | 4/2005 | Tucker ......................... 283/105 |
| 2005/0140063 | A1 | * | 6/2005 | Cleary ......................... 264/400 |
| 2006/0036492 | A1 | * | 2/2006 | Becker ........................... 705/14 |
| 2006/0108266 | A1 | * | 5/2006 | Bowers et al. ................ 209/584 |
| 2007/0272666 | A1 | * | 11/2007 | O'Brien et al. .......... 219/121.69 |

* cited by examiner

*Primary Examiner* — Yuwen Pan
*Assistant Examiner* — Mark Woodall
(74) *Attorney, Agent, or Firm* — McDermott Will & Emery LLP

(57) ABSTRACT

The present application relates to a method and system thereof for performing laser cutting on a mail piece during processing on a document processing device such as a sorter. Laser cutting is performed to effectively cut mail pieces during transport on the document processing equipment to ensure cut accuracy and to promote readability. The present teachings allow for selection of a cut profile based on mail piece attributes or markings and adaptive adjustment of the cut profile in accord with the positioning of the mail piece to achieve a desired cut pattern while the document processing device is running at high transport speed.

10 Claims, 6 Drawing Sheets

PROFILE BASED LASER CUTTING WITHIN A HIGH-SPEED TRANSPORT DEVICE

TECHNICAL FIELD

The subject matter discussed herein relates to methods, systems and elements thereof for performing laser cutting within a document processing environment such as sorting.

BACKGROUND

Document processing facilities often use high speed document processing machines such as sorters to sort and direct mail items appropriately to one or more mail bins for distribution. The efficiency of a sorter is generally dependent upon various factors, including the rate at which mail items can be fed into a mail transport and subsequently transported along a transport path via a system of belts, mechanized levers and rollers, the ability for the address components (e.g., recipient address, ZIP code, bar code) marked upon the mail items to be identified by a reader device for association of each mail piece with a sort scheme managed by a sort scheme computer and the number of mail items that can be effectively stacked by a mail stacker into one or more mail pockets or bins in accordance with the specified sort scheme.

In more advanced sort operations it may be necessary to purposefully cut a mail piece during transport, such as in accord with a desired cut pattern, to render full opening for extraction of contents within the mail piece or to reveal previously concealed information as enveloped by or located on the mail piece. In the latter case, a segment of the mail piece sufficient for revealing the concealed information is cut. The revealed information may then be imaged, interpreted and conveyed as input data to the sort scheme computer to affect which mail bin that mail piece is ultimately directed. Of course, when applying cutting techniques to a mail piece during transport, it is important to avoid measures that invariably damage the mail piece or restrict the ability of an imaging/reading device to interpret the information placed thereon—i.e., ripping, puncturing or wrinkling the mail piece. Unfortunately, most approaches employed today for selective cutting during processing involve the use of a grinder, slitter or blade mechanism—i.e., a mechanical milling, cutting or grinding device. These cutting techniques, however, are generally limited in its application, because of the difficulty in stabilizing and positioning the cutter and the mailpiece in a fast transport. They are more prone to either damaging the contents or making an insufficient cut because a setting that works for thick mail will not be the best for thin mail. This limitation is even more severe with mixed mail with different envelope materials. What is needed, therefore, is a means for enabling effective cutting of mail pieces during transport to ensure cut accuracy and to promote readability. In particular, the ability to adaptively adjust a cut profile and other cut parameters in accord with the positioning of the mail piece to achieve a desired cut pattern while accounting for high transport speed is of particular importance.

SUMMARY

The teachings herein alleviate one or more of the above noted problems by providing a method for laser cutting a plurality of mail pieces to expose information concealed by the mail pieces during run-time operation by a sorter system. An objective of this method is to open or initiate the opening of the mail piece, such as an envelope, in order to extract the contents therein. The method includes loading a sort scheme based at least in part on sort parameters corresponding to the concealed information. One or more cut profiles is loaded based at least in part on criteria affecting laser cutting of at least one of the mail pieces. In certain examples, a selection of cut criteria/specifications is based on a physical attribute or marking on one or more mailpieces and/or a user defined setting. A portion of the mail piece is laser cut in accordance with the criteria to expose the concealed information located on the mail piece. The exposed information is captured and the mail piece is sorted based at least in part on an analysis of the captured information.

It is desirable to further provide a document processing system for processing of a plurality of mail pieces having concealed information. The system includes a document processing device for processing the plurality of mail pieces. A laser cutting device is adapted to cut a portion of at least one of the mail pieces in accordance with criteria used to expose the concealed information. These criteria may be static for the particular job, or could be selected for each mail piece processed based on an identifying attribute (physical attribute or marking) of the mailpiece. A database is provided and contains document processing instructions based at least in part on parameters corresponding to the concealed information of the plurality of mail pieces. A process controller is included for providing cutting criteria to the laser cutting device to perform laser cutting of the mail piece during transport on the document processing system. An image capturing device captures both the markings on the envelope to optionally select the criteria for the cut and the exposed information after the cut is complete. Devices to measure the physical attributes (length, height, thickness, weight) could also be used to select the criteria for the cut.

It is yet further desirable to provide a sorting system for processing of a plurality of mail pieces having concealed information. The sorting system includes a sorter device for processing the plurality of mail pieces. A laser cutting device is adapted to cut a portion of at least one of the mail pieces in accordance with criteria used to expose concealed information. A database is provided and contains sort scheme instructions based at least in part on sorting parameters corresponding to the concealed information of the plurality of mail pieces. A process controller is included for providing cutting criteria to the laser cutting device to perform laser cutting of the mail piece during transport on the sorter device. An image capturing device captures the exposed information.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
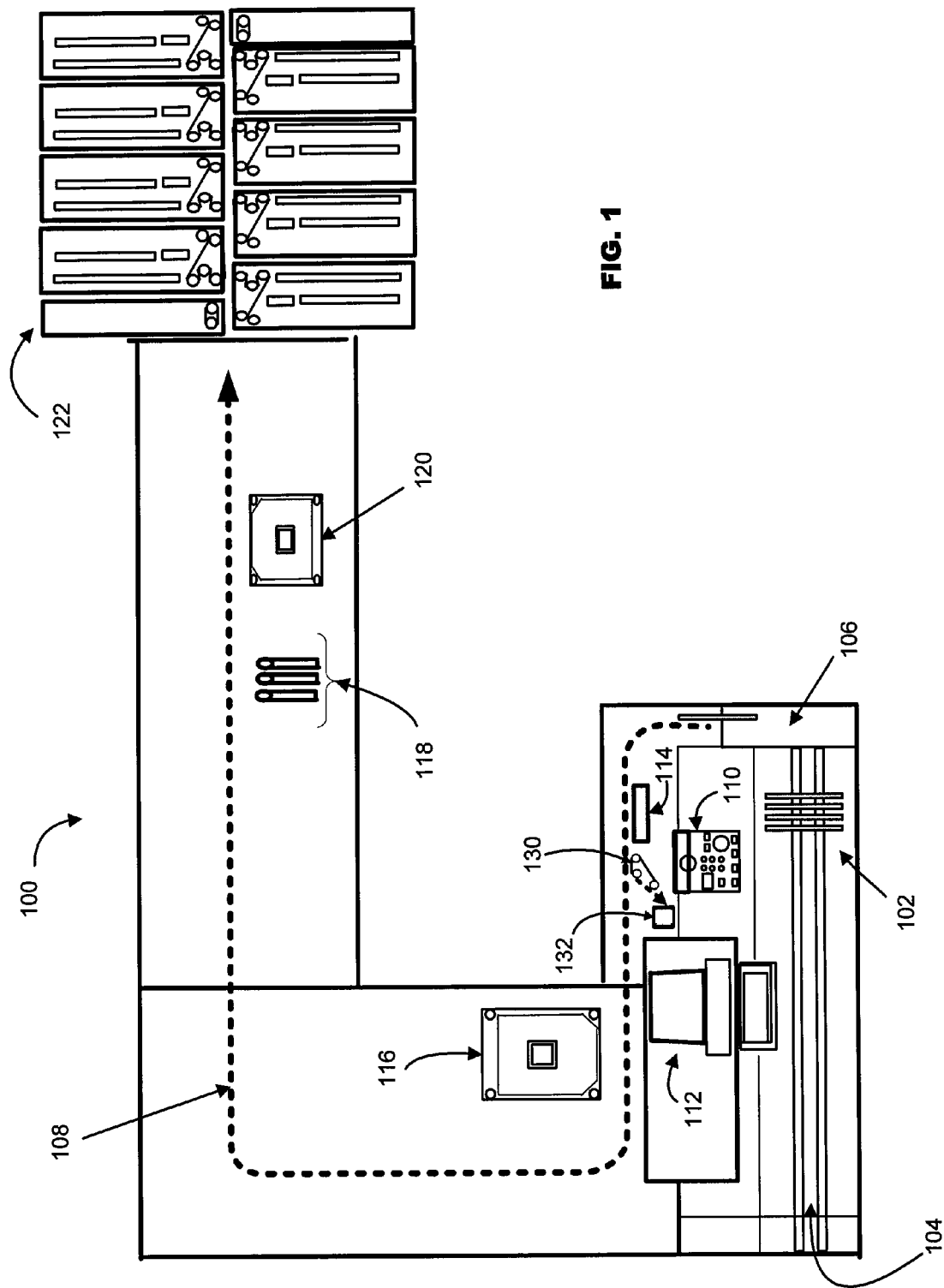
FIG. 1 is an exemplary depiction of a sort processing device equipped with a laser cutting mechanism.

The following description refers to numerous specific details which are set forth by way of examples to provide a thorough understanding of the relevant teachings. It should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings. It will be appreciated by those versed in the art that the exemplary teachings described herein enable laser based cutting of mail pieces during transport to enable commencement of sort operations. While the foregoing discussion generally presents the teachings in an exemplary fashion with respect to a conventional sorter device, it will be apparent to skilled artisans that the teachings may apply to any type of document processing device or system (e.g. an inserter, accumulator, etc.) where advanced mail piece cutting techniques are desired or required.

As used herein, the term "document processing system or machine" refers to any high speed transport device(s) capable of processing documents at considerably high rates with considerably high precision. Indeed, a document processing system may be one such tool usable for enabling inline verification, and may include a combination of other integrated devices for processing mail items. Document processing systems may include, but are not limited to, inbound mail sorting equipment, outbound mail sorting equipment and even various forms of inserter machines, vision or data integrity systems, or combinations thereof for use within office, commercial, or industrial settings. In general, processing tasks performed by the machine during run-time involving the transport of a mail piece may include, but is not limited to: imaging and interpreting of the various markings resident upon the mail piece(s), measuring of physical or material attributes, determination of a specific mail bin the mail pieces(s) is to be directed, marking or adding labels to the mail pieces(s), cutting or opening mail pieces, applying or verifying barcodes and other rules generally set forth according to a defined schema (e.g., sort scheme, machine control scheme, business scheme, etc.).

Also, as used herein, the term "mail piece" as used herein refers to any document having human or machine readable content generated thereon, and particularly that intended for delivery to a given recipient. Generally, this may include envelopes, newsletters, newspapers, magazines, post cards, parcels or packages of varying thicknesses (e.g., flat mail), coupon booklets, brochures, and any other like items. Such items may or may not be generated for the purposes of being distributed via a distribution channel (e.g., delivery company, postal authority), but rather, may be generated for direct/personal carry, delivery, or internal distribution. When a plurality of mail pieces as described above are grouped together, this is referred to as a mail group or grouping. Groupings may include a plurality of mail pieces having a common ZIP code or range thereof, common internal destination point, or common rules, limitations, or special instructions as defined according to a sort scheme.

The description now proceeds with a discussion of FIG. 1, which depicts an exemplary document processing device 100—in the form of a sorter system—for processing mail pieces 102 in accord with the exemplary teachings. The mail pieces 102 are shown advancing down a magazine 104 of the sorter system 100 into a mail piece feeder 106. The feeder singulates the mail pieces 102 and subsequently feeds them to the transport path 108 of the system 100 to enable their transport to the various other sub-components of the sorter system 100. A control panel 110 provides an interface to a machine control system for enabling settings that affect the response of the sorter system 100 and/or its various sub-components (e.g., transport belt timing, encoder operation, sensor processing, print processing, cut processing, etc.). Operating in association with the control panel 110 and machine control system is one or more sort control computers 112, which provides a graphical user interface for enabling presentment of system response variables as well as for enabling execution of appropriate machine and software control schemes respective to the transport mechanism 108.

The various sub-components of the sorter system that process a mail piece 102 once engaged along the transport path 108 may include, but is not limited to; a cutting mechanism 114 for selectively cutting portions (i.e., partial or full length or width mail piece patterns) of the mail piece in accord with a desired pattern or cut scheme, a removal device 130 for removal of the selectively cut portions of the mail piece along with a receptacle for disposing the cut portion 132, a reader device 116 for detecting, imaging and subsequently interpreting any markings for selection of the cut criteria and for detecting, imaging and subsequently interpreting any markings revealed by the mail piece during transport (i.e., in conjunction with character recognition software), one or more print heads 118 for applying printed markings such as text, barcodes or illustrations to a mail piece, a print verification device 120 for verifying the accuracy and application of the markings and a plurality of sort bins 122 for accumulating mail pieces in accord with an applied sort scheme. Though not expressly shown, the transport path 108 may also comprise one or more belts tightly wound around mechanized rollers, various levers, encoders, presence sensors, detectors, actuators, diverters and other corresponding electronic or mechanical components. Furthermore, the document processing system 100 may employ other sub-components, such as printers, labelers, additional imaging devices, etc. for performing various processing tasks during run-time—i.e., imaging devices for detecting markings placed upon the mail piece prior to cut. All of these components, in whole or in part, enable effective transport of mail pieces from the feeder 106 to the sort bins 122 in accord with a defined sort scheme. It will be recognized by skilled practitioners that the orientation, placement and general presence of the sorter system 100 and the sub-components described herein may vary. Of particular interest with regards to the teachings herein is the employment of a laser cutter as a preferred cutting mechanism 114 within the document processing system 100.

Laser cutting techniques involve directing the output of a laser source, generally by way of a computer (e.g., the machine control computer 110 or independent laser control computer/processor), at the mail piece in accord with a predetermined cut pattern. The cut pattern may be designated during initial job setup by an operator to coincide with a specific sequence of coordinates—i.e., a start point, next point, end point (e.g., waypoints) to result in varying cuts. This sequence of coordinates may be deemed a cut profile and may be defined according to a profile template, i.e., a graphic design template as created using a design software tool (CAD), machine language instruction file, etc. Alternately, the cut pattern could be dynamically changed for individual pieces based on physical/material attributes and/or markings captured by devices or readers that process the mail piece prior to cut. So, for example, the particular placement of a marking, when detected, may trigger the execution of a particular cut profile. Upon activation of the laser, the material which the mail piece is composed then burns or vaporizes to produce a crisp cut pattern. The resulting cut segment of the mail piece can then be removed by various means—i.e., vacuum suction, air blowing, mechanical picker fingers. Behavior of the laser such as depth of beam penetration or intensity and/or its motion will vary in accord with one or more of the following variables:

A proper balance of the above described variables must be undertaken to ensure appropriate cutting of a mail piece during high speed transport. In addition, there may be other factors of consideration such as mail piece feed rate, beam geometry, beam focusing, mail piece material type and positioning accuracy, etc. Of course, it will be readily understood by those skilled in the art that such variables vary depending on the actual physical, electrical and mechanical configuration and implementation of the laser itself; all of which may vary from one laser vendor to the next. As an example, consider TABLE 2 below which presents specification data pertaining to an exemplary 200 W $CO_2$ laser cutter available on the market today. $CO_2$ lasers are commonly "pumped" by passing a current through the gas mix through direct current (DC) or radio frequency (RF) energy excitation. Various $CO_2$ laser vendors offering compatible arrays of laser technology may include but are not limited to Coherent Inc., Northrop Grumman Cutting Edge Optronics or Evergreen Laser Corporation.

TABLE 1

Variables that affect laser cutter behavior

| Laser behavioral characteristic | Variable dependency |
| --- | --- |
| Characteristic: Depth of penetration of the laser | Variable: Defined, measured or sampled outer, inner or combined thickness of the mail piece; beam geometry. Note: Defined thickness may be known in advance and provided as input to the laser control mechanism. Measured thickness may be determined via usage of a thickness detection device. Sampled thickness may be determined from sampling multiple like mail pieces in advance of a job run to determine a general/average mail piece thickness or to alternatively adjust laser depth/intensity through trial and error. Both measured and sampled thickness act as laser control input. Beam geometry may be another consideration depending on the optical characteristics and/or relative position to be embarked by a given laser head during mail piece transport. |
| Characteristic: Laser beam intensity (output power wattage) | Variable: Same as above plus one or two dimensional motion of the laser; transport speed. Note: Laser beam intensity may be decreased at moments of reduced transport speed or increased at moments of increased transport speed. The laser beam intensity may also be a function of the required X and/or Y coordinates/motion of the laser - i.e., angular or vertical cuts may require increased intensity to accommodate a mail piece in horizontal transport while a horizontal cut may require less. All of these variables may act as laser control input. |
| Characteristic: Laser Motion | Variable: Cut length; X and/or Y coordinates corresponding to the desired cut pattern (profile); transport speed; cut profile characteristics (e.g., continuous cut versus perforated cut, or a combination thereof). Note: Laser motion may also vary depending on its configuration. For example, the laser may have one or more cutting heads by which to facilitate cuts, may produce pulse modulated beams or have single or dual axis movement (e.g., vertical and/or horizontal movement). Typically, single axis movement results in a more constant beam delivery. Speed of motion of the laser cutting heads must accommodate the known transport speed of the mail pieces being cut. An additional consideration would be whether or not the cut will be continuous, perforated or a combination of both. All of these variables may act as laser control input. |

TABLE 2

Exemplary Laser Specifications
CO2 Laser Cutter Specifications:

| | | |
|---|---|---|
| Output Power | | 200 W |
| Mode Quality | | TEM00, 90% Purity $M^2 < 1.2$ |
| Ellipticity | | <1.2 |
| Rise Time | | <150 μsec |
| Beam Diameter | | 4 mm |
| Beam Divergence (full angle) | | 3.5 mR |
| Wavelength | | 10.59 μm |
| Power Stability (cold start) | | ±5% |
| Polarization | | Random |
| Cooling | | Water |
| Heat Load (max) | | 4000 W |
| Flow Rate (18-22° C.) | | 4 GPM |
| Input Voltage/Current | | 30 VDC/160 A |
| Dimensions, laser head | (in) | 45.6 × 6.9 × 10.8 |
| | (mm) | 1158 × 175 × 274 |
| Dimensions, RF supply | (in) | 12.0 × 19.0 × 8.9 (×2) |
| | (mm) | 305 × 483 × 226 (×2) |
| Weight, laser head | | 70 lbs/31.8 kg |
| Weight, RF supply | | 32 lbs/14.6 kg (×2) |

Beam specifications measured at $1/e^2$.

Indeed, various laser cutter configurations, implementations and vendors are well known in the art. Furthermore, various optical control elements, such as mirrors, prisms, beam guides and lenses, light sources and retardants, and functional elements such as heat reduction systems, back plating, motors, encoder sensors, etc. are contemplated for use in various configurations of the laser cutter. The examples discussed herein are not intended to be exclusive. Furthermore, the actual cutting scheme employed may vary from one application environment to the next; a few examples of which are outlined below and presented with respect to FIGS. 2-3.

Figure 2:
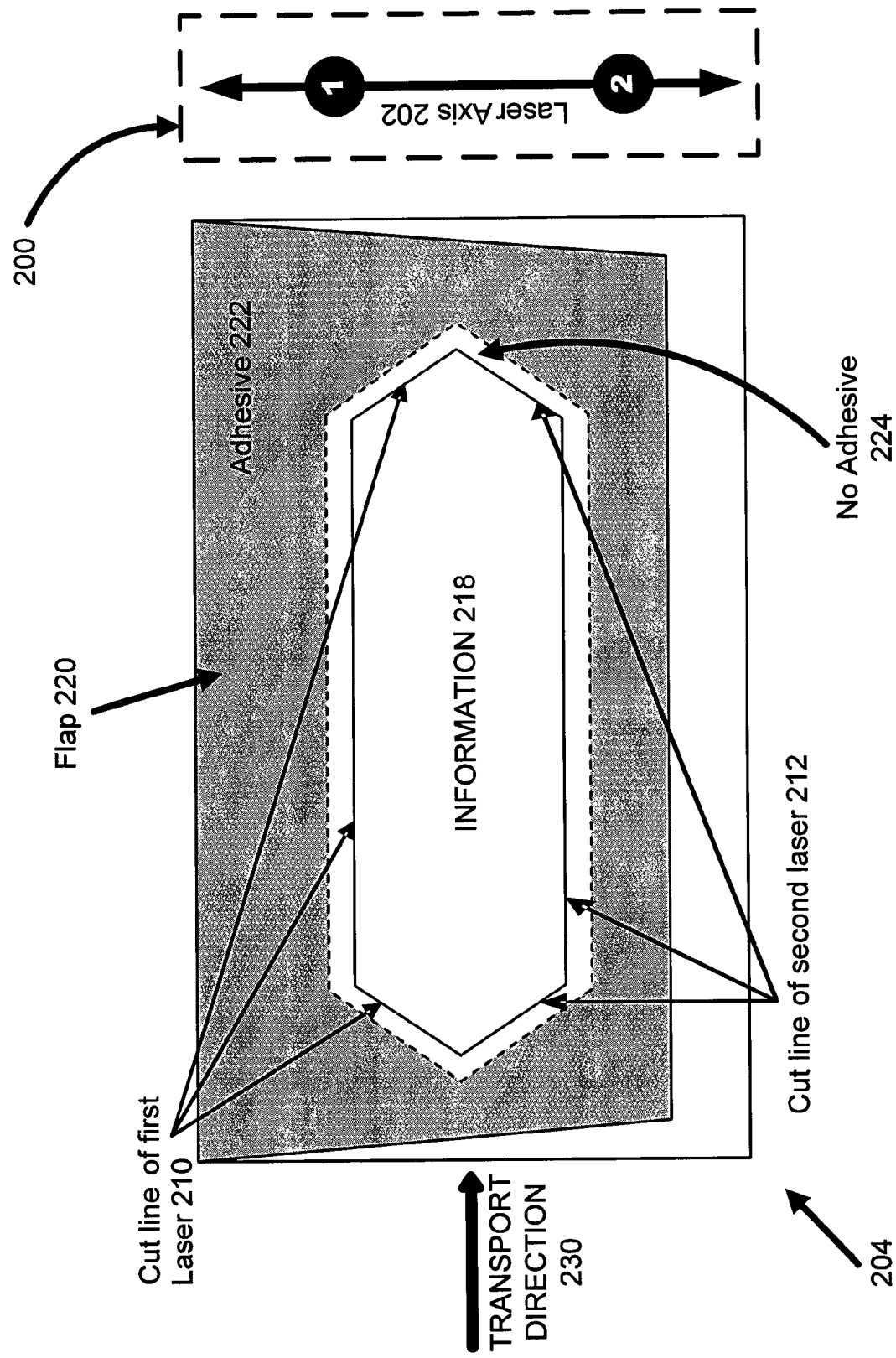
FIG. 2 is an exemplary depiction of an envelope featuring a cut pattern capable of being produced by the laser cutting mechanism of FIG. 1.

With respect to FIG. 2, an in-line laser cutter 200 featuring two lasers labeled 1 and 2 are positioned and the beams are movable about a fixed vertical axis 202 by a servo-controller (feedback based motor) that guides the beams. The servo-controller guides the beams from Lasers 1 and 2 about the vertical axis 202 based on control commands received from a laser controller. Control commands will be based at least in part on the appropriately defined variables presented in TABLE 1 (and/or like specification parameters in TABLE 2) to cut out a desired segment of the mail piece 204, in this case an envelope. Because the laser axis 202 is fixed within the laser cutter mounting 200, the lasers employ only vertical motion for the beams—i.e., one laser moving up and another moving down, which in combination with the horizontal motion of the envelope 230 achieves the desired cut lines, including angular cuts. The cut lines executed by the Laser 1 and Laser 2 are labeled as 210 and 212, respectively, a pattern which would be defined in advance of laser 200 operation. In this example, the desired cut pattern is sufficient to cut enough mail piece material concealing any information 218, labeled as such. The information 218 may be a barcode, address, signature, illustration, text or any other data capable of being interpreted (e.g., imaged and decoded) to affect subsequent sort decisions or downstream sort operations.

The exemplary mail piece 204 features a flap 220 having an adhesive backing shown in the illustration as shaded area 222. A second area of the flap 220 features an area 224 where no adhesive is applied, this segment of the mail piece 204 being best suited for cutting by Lasers 1 and 2. The adhesive backing is optional and will help in avoiding complications that may arise while stacking the mailpieces after cutting in the sort bins. The dotted line shows the possible position of the cutter 200, accounting for horizontal motion of the envelope and vertical motion of Lasers 1 and 2, to achieve the desired cut lines 210 and 212. As the mail piece traverses laser 200 during transport, Laser 1 moves from a starting position up and then back down while Laser 2 moves down and then back up to generate the desired cut. As an alternative to a dual laser system 200, a single beam laser may be split via optical techniques to achieve the same affect. Still yet a single beam may be employed about the vertical axis 202 that moves rapidly back and forth between the two paths as the mail piece traverses the mail transport so as to achieve a continuous cut. Regardless of the preferred implementation, in this example the lasers are fixed about the axis 202 for only vertical movement while the mail piece 204 moves horizontally at a relatively steady speed commiserate with the speed of the transport (e.g., between 150 to 200 inches/sec). Of course, those skilled in the art will recognize that various other implementations may be possible.

Figure 3:
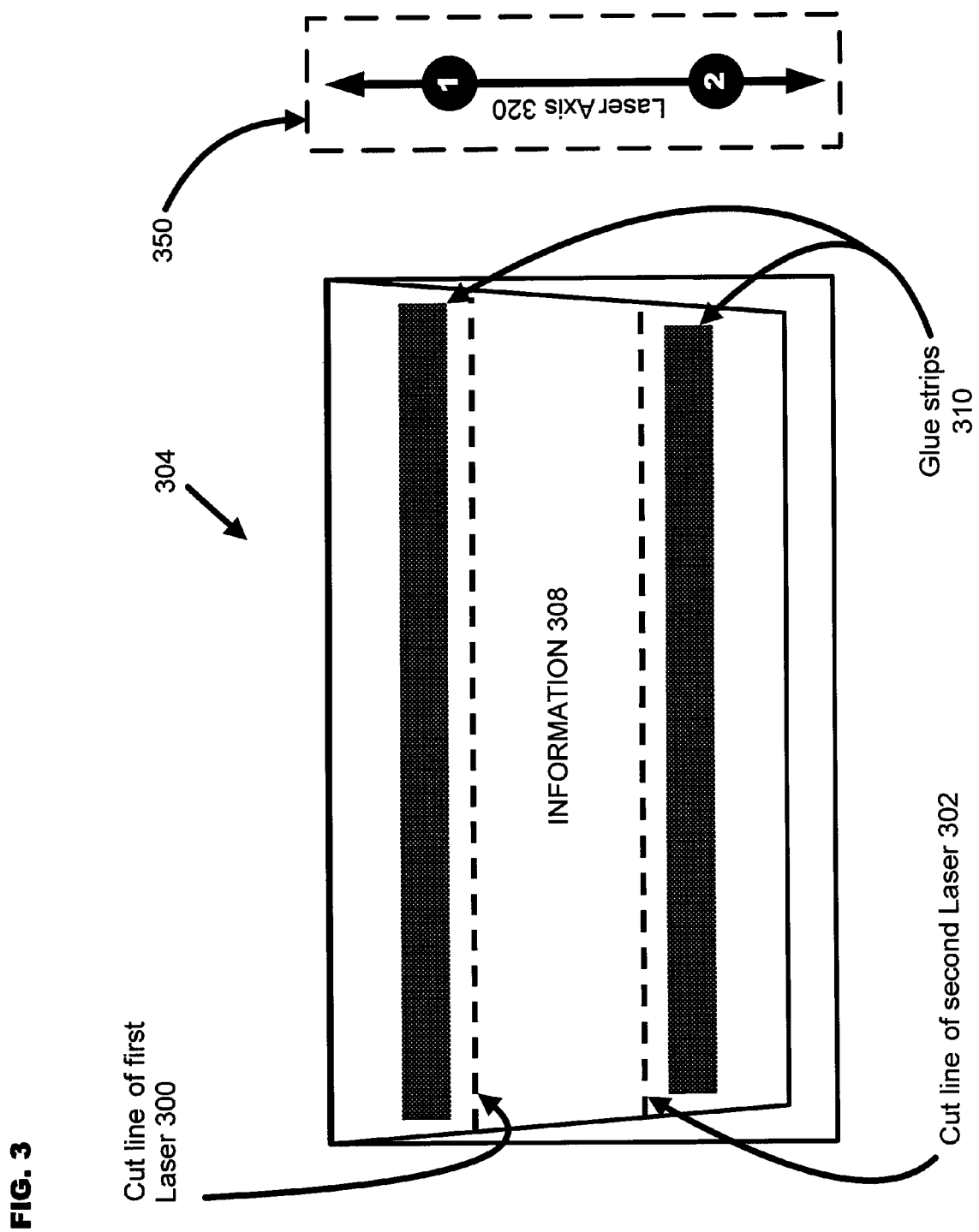
FIG. 3 is another exemplary depiction of an envelope featuring a cut pattern capable of being produced by the laser cutting mechanism of FIG. 1.
Figure 5:
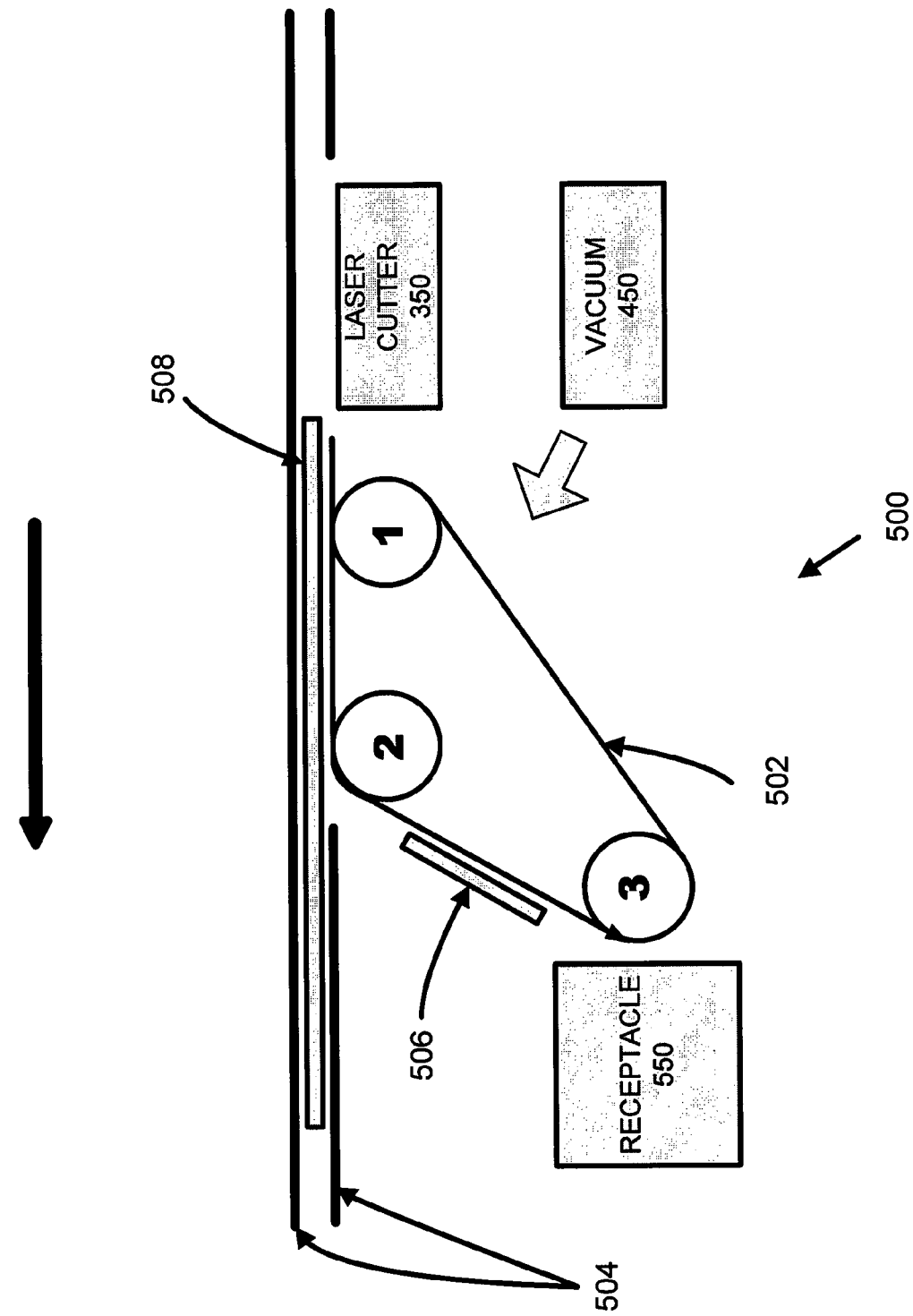
FIG. 5 is an exemplary depiction of a mail piece material removal mechanism usable in connection with the laser cutting mechanism of FIG. 1.

Referring now to FIG. 3, an alternative means for revealing concealed information via laser cutting techniques is shown. In this example, Lasers 1 and 2 produce horizontal cut lines 300 and 302 along the flap of mail piece 304 to expose information 308 once the cut out mail piece material is removed. With this cut configuration, Lasers 1 and 2 remain completely fixed along primary axis 320 while the envelope traverses laser 350 horizontally, resulting in a simpler system, with minimal or no beam guiding components. To enable effective removal of only the segment of the mail piece material desired to be cut, glue strips 310 may be utilized to keep desired segments in place. The mail piece material to be removed—between cut lines 300 and 302—may then be removed by removal device 500, depicted in FIG. 5, that is mounted immediately downstream of the laser cutter 350.

While the removal device 500 may be implemented in various ways by those skilled in the art, the exemplary depiction is a vacuum assisted belt assembly. In particular, the removal device 500 comprises a pickoff belt 502 operating at the same speed and direction 230 of the primary transport belts 504 of the transport mechanism. The pickoff belt may feature one or more air holes through which vacuum force is exerted to enable plucking/pick-off of the cut mail piece material 506 from the mail piece 508; the mail piece material 506 then being directed to a receptacle 550. Vacuum suction may be generated by vacuum 450 which runs one or more vacuum tubes through Rollers 1-3 and onto/through the pickup belt 502. Selective activation or deactivation of the vacuum 450 may be employed to affect when suction is applied—i.e., vacuum 450 is deactivated to enable release of the mail piece material 506 into receptacle 550. Reverse air flow may be adjusted accordingly so that suction power is sufficient to remove the mail piece material 506 without restricting the mail piece 508. Much like the laser cutting mechanism 350, the vacuum 450 may adapt to differing mail piece characteristics (e.g., type of material).

In the exemplary scenarios presented above, alternative cutting techniques could be employed. For example, as opposed to a continuous laser beam cut, a pulse modulated cut could be employed in both FIGS. 2 and 3 to create a perforated pattern or a combination of continuous and perforated cut. In the case where both a continuous and perforated cut is executed as part of a single cut profile, this may result in reduced damage of the contents of the mail piece or lessened nicking/tearing of the mail piece upon removal of the cut portion. As another alternative, a single laser could be employed to achieve the above described cut lines, such as through rapid point-to-point vertical movement of the beam to produce the upper and lower cut lines. Though not continuous in nature, this would be performed at a frequency sufficient to enable removal of the cut portion of the mail piece accordingly. Alternatively, a single beam could be split into two and used in conjunction with the appropriate optical elements (e.g., mirrors, prisms, lenses) to focus the output laser light to produce the desired cut lines.

Still yet, as opposed to multiple cut lines being performed as presented with respect to FIG. 2-3, a single cut line could be executed for enabling the contents of the mail piece 204 or 304 to be extracted. In this case, the cut is performed proximate to the bottom or top edge of the mail piece 204/304 so as to enable a through cut without damaging any internal contents of the mail piece 204/304. The position of the cut could be determined by the height and length measuring device. A through cut is one where the laser intensity and hence depth is sufficient to pass through the mail piece, which in this case creates an opening for extraction of the contents. Alternatively, the single cut could be executed towards the middle of the mail piece 204/304 where the contents are present, but with the intensity adjusted accordingly to yield a kiss-cut. A kiss cut is one where the laser intensity and hence depth is sufficient to pass through a limited portion of the mail piece making the kiss cut suitable for cutting multi-layered or thick mail pieces without full depth penetration (e.g., to enable surface cuts). The intensity for the kiss cut could be determined by retrieving preset criteria based on a physical or material attribute measured by appropriate devices or by a marking interpreted by a reader or a combination of some or all of these. In either case, extraction may be performed via use of devices that pull both faces of the mail piece open or by some other means that would enable an extractor to remove the internal contents.

Figure 4:
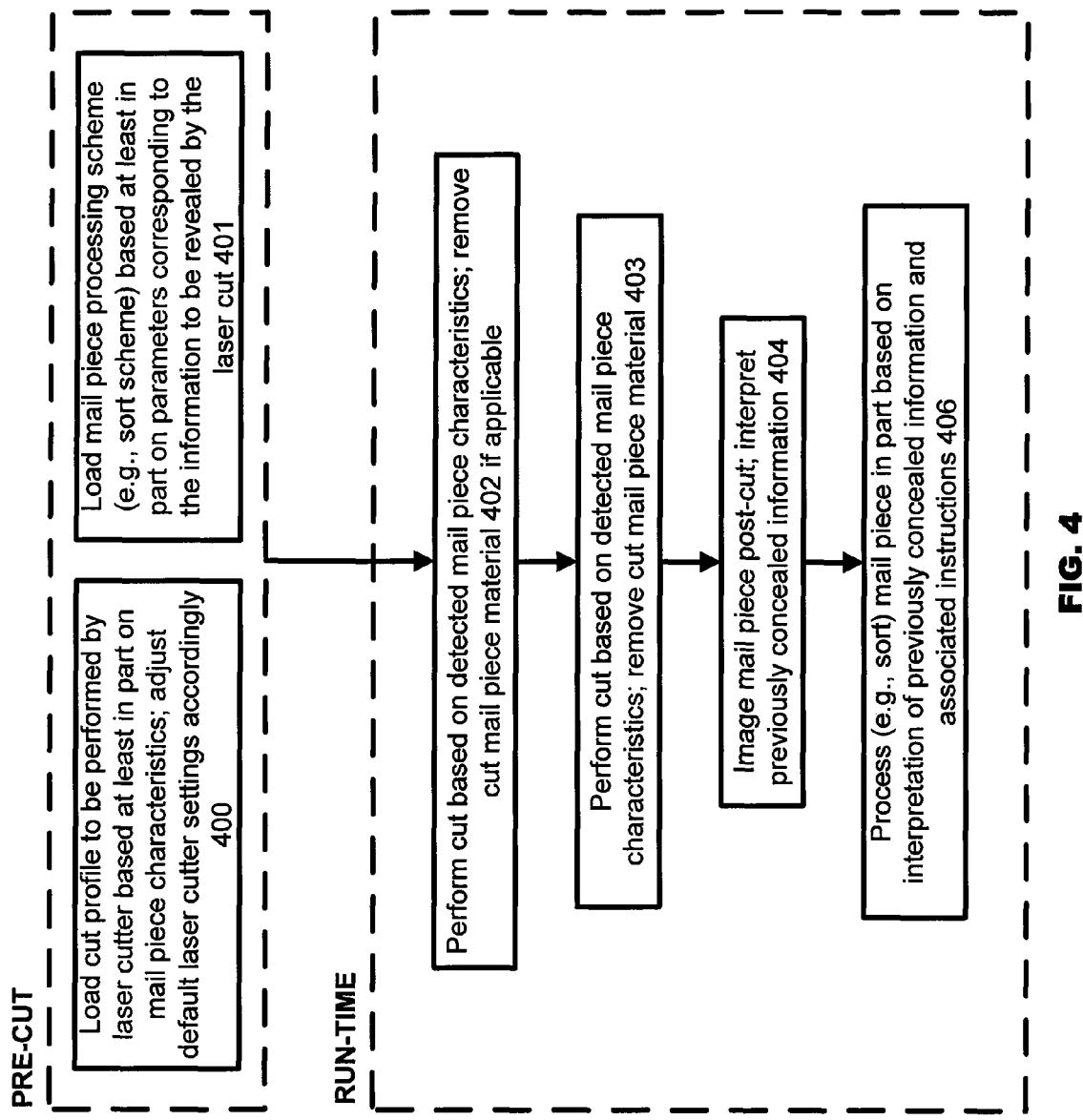
FIG. 4 is a flowchart depicting an exemplary sort process to be enacted by the sort processing device of FIG. 1 resulting from processing of the envelope of FIGS. 2 and 3.

FIG. 4 is a high-level flowchart depicting an exemplary sort process to be enacted by the sort processing device of FIG. 1 resulting from processing of the mail pieces 204 and 304 of FIGS. 2 and 3 respectively. As a first processing task (step 400), an operator defines and subsequently loads the desired cut profile information to be performed by the laser cutter. The cut profile information may comprise various instructions to be executed based at least in part on the characteristics of the mail piece to be cut. In the context of the exemplary teachings presented herein, mail piece characteristics may be any physical or functional parameters associated with the mail piece to be cut, such as design layout, color, size, thickness, material type, envelope type, text/markings, etc. These characteristics may be detected during run-time, measured prior to cutting of the mail piece or known in advance of cutting, so as to affect the desired cut profile to be employed. So for example, consider a first mail piece containing or having located thereon a signature intended for being verified in a vote-by-mail operation in the state of New York. Also, consider a second mail piece containing or having located thereon a signature intended for being verified in a vote-by-mail operation in the state of Hawaii. Though both mail pieces have a common purpose they may differ in design or form given their separate jurisdictions. The difference would be determined from image and analysis of the mail piece prior to it being cut, the image data being sufficient to trigger the correct profile to be employed by the cutter if said data is recognized (e.g., loaded prior to run-time operation). When the image data is not recognized, the cutter can then execute a default action or none at all. An additional imaging/reading device or physical parameter detection device (e.g., thickness detector) would be employed upstream from the cutting mechanism 114 in such case for enabling dynamic cut profile adaptation.

Skilled artisans will appreciate that the above described teachings afford mixed mail handling document processing devices to more readily adapt to cutting of different mail piece types dynamically. Indeed, the laser cutter may be calibrated or adjusted (dynamically) based on the mail piece characteristics along with the various measures and variables outlined in TABLE 1. In addition, a sort scheme to be executed by the sort processing device based at least in part on sort parameters corresponding to the information to be revealed as a result of the laser cut performed may also be loaded into the sorter control computer (step 401). Both steps 400 and 401 represent pre-cut processing tasks—i.e., those required to be established and loaded in advance of a job run to ensure a desired sort outcome given a variety of mail piece possibilities.

The next processing steps represent run-time activities—i.e., those performed during the job run. As a general processing task (step 402), the laser cutter performs a cut in accord with the defined profile and/or mail characteristic and the resultant cut mail piece material is then removed (step 403). This exposes the information previously concealed by the mail piece material, enabling it to be imaged and interpreted to facilitate appropriate sort processing (step 404). The end result of sort processing is advancement of the mail piece, in its cut or possibly extracted form, to the prescribed sort bin 122 (step 406). Those skilled in the art will recognize the effectiveness of laser based cutting techniques to facilitate accurate sort processing all the while maintaining relatively consistent transport speed during run-time. In addition, laser cutting within a document processing device results in less paper dust accumulation, tearing or overall waste. Furthermore, a carbon imprinting device or carbon manufactured envelope could be used to reduce the required laser beam intensity and therefore minimize burning or vaporizing of contents to be revealed. In the former case, the imprinting device would operate in advance of the cutting mechanism to render a carbon print of the cut profile.

Although the discussion above has focused largely on the methodologies of profile based laser cutting, those skilled in the art will recognize that those methodologies may be controlled or implemented by one or more processors/controllers, such as one or more computers or servers (ref. numeral 110 in FIG. 1). This includes the laser cutting mechanism, which may be implemented as one or more microcontrollers. Typically, each such processor/controller is implemented by one or more programmable data processing devices. The hardware elements operating systems and programming languages of such devices are conventional in nature, and it is presumed that those skilled in the art are adequately familiar therewith.

Figure 7:
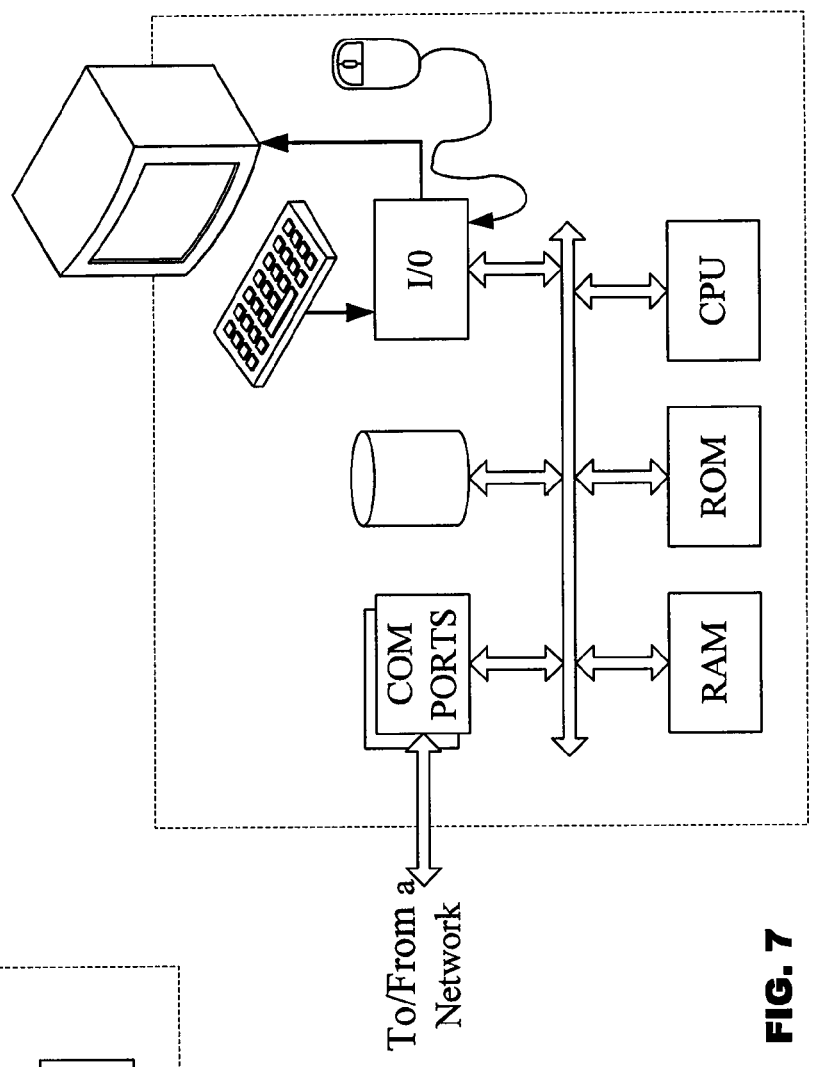
FIG. 7 depicts a computer with user interface elements.
Figure 6:
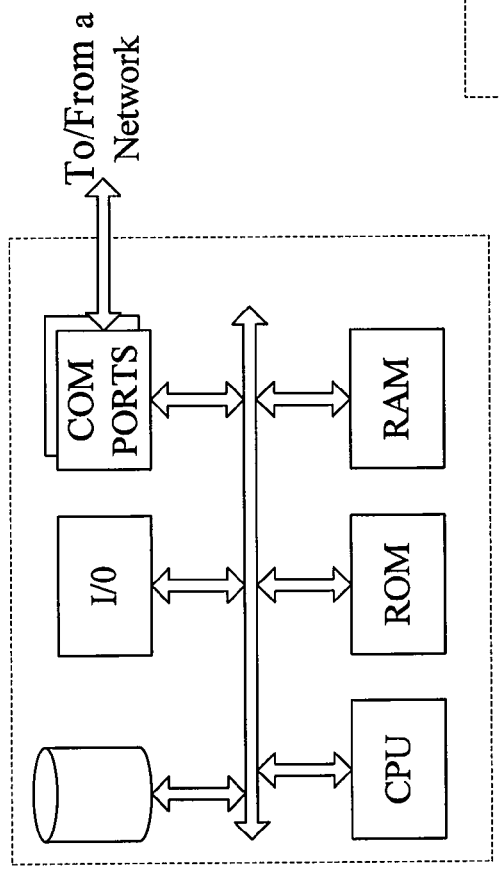
FIG. 6 illustrates a network or host computer platform, as may typically be used to implement a server.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station or terminal device, although the computer of FIG. 7 may also act as a server if appropriately programmed. It is believed that those skilled in the art are familiar with the structure, programming and general operation of such computer equipment and, as a result, the drawings should be self-explanatory.

For example, cutting mechanism 114 may be a PC based implementation of a central control processing system like that of FIG. 7, or may be implemented on a platform configured as a central or host computer or server like that of FIG. 6. Such a system typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM, or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software as well as data, such as sort scheme instructions and image data generated in response to the interpretation of any markings revealed after cutting of the mail piece. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems such as the reader device 116, the print heads 118 and print verification device 120. In a document processing environment, such as in the case of sorting, computer communications may extend to other processing equipment and to various sorting elements, such as sort bins 122. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer in a document factory may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for processing document data as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art.

Hence aspects of the techniques discussed herein encompass hardware and programmed equipment for controlling the relevant document processing as well as software programming, for controlling the relevant functions. A software or program product, which may be referred to as an "article of manufacture" may take the form of code or executable instructions for causing a computer or other programmable equipment to perform the relevant data processing steps regarding document printing and associated imaging and print quality verification, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the sorting control and attendant mail item tracking based on unique mail item identifier. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A document processing system for processing of a plurality of mail pieces having mail content and concealed information, the system comprising:
   a document processing device for processing the plurality of mail pieces;
   a laser cutting device adapted to cut, in accordance with a cut profile, a portion of at least one of the mail pieces in accordance with criteria used to expose the concealed information, without damaging the mail piece content;
   a vacuum belt, air blower or mechanical picker fingers adapted to remove the cut portion of the one mail piece;
   a database containing document processing instructions based at least in part on parameters corresponding to the concealed information, read by an image capture device, of the plurality of mail pieces; and
   a process controller for providing cutting criteria to the laser cutting device, in accordance with the cut profile, to perform laser cutting of the mail piece during transport on the document processing system, wherein
   the image capturing device is configured for capturing the exposed information, and the image capturing device includes a reader device adapted to detect, image and interpret the exposed information.

2. The document processing system according to claim 1, wherein the document processing device is selected from sorting equipment, inserting equipment, accumulating equipment, vision integrity equipment or data integrity equipment.

3. The document processing system according to claim 1, wherein the database contains document processing instructions selected from sort schemes or equipment control schemes.

4. The document processing system according to claim 1, wherein laser cutting device uses at least one optical element, selected from one or more mirrors, prisms, beam guides and lenses to perform the cut profile.

5. A document processing system for processing of a plurality of mail pieces having concealed information, the system comprising:
   a document processing device for processing the plurality of mail pieces;
   a laser cutting device adapted to cut, in accordance with a cut profile, a portion of at least one of the mail pieces in accordance with criteria used to expose the concealed information;
   a vacuum belt, air blower or mechanical picker fingers adapted to remove the cut portion of the one mail piece;
   a database containing document processing instructions based at least in part on parameters corresponding to the concealed information of the plurality of mail pieces;
   a process controller for providing cutting criteria to the laser cutting device, in accordance with the cut profile, to perform laser cutting of the mail piece during transport on the document processing system; and
   an image capturing device for capturing the exposed information, wherein the image capturing device includes a reader device adapted to detect, image and interpret the exposed information,
   wherein the laser cutting device comprises one or more laser heads for cutting the portion of the mail piece in accordance with the cutting criteria.

6. The document processing system according to claim 5, wherein the one or more laser heads is adapted to generate a continuous laser cut.

7. The document processing system according to claim 5, wherein the one or more laser heads is adapted to generate a pulse modulated laser cut.

8. The document processing system according to claim 5, wherein the one or more lasers heads are in fixed or movable positions along a transport path of the mail piece during processing on the document processing device.

9. A sorting system for processing of a plurality of mail pieces having concealed information, the sorting system comprising:
   a high speed sorter device for processing the plurality of mail pieces;
   a laser cutting device adapted to cut, in accordance with a cut profile, a portion of at least one of the mail pieces in accordance with criteria used to expose concealed information;
   a vacuum belt, air blower or mechanical picker fingers adapted to remove the cut portion of the one mail piece;
   a database containing sort scheme instructions based at least in part on sorting parameters corresponding to the concealed information of the plurality of mail pieces;
   a process controller for providing cutting criteria to the laser cutting device, in accordance with the cut profile, to perform laser cutting of the mail piece during transport on the sorter device; and
   an image capturing device for capturing the exposed information, wherein the image capturing device includes a reader device adapted to detect, image and interpret the exposed information.

10. The sorting system according to claim 9, wherein the laser cutting device comprises one or more laser heads for cutting the portion of the mail piece in accordance with the cutting criteria.

* * * * *